United States Patent [19]
Kadlicko

[11] Patent Number: 5,313,844
[45] Date of Patent: May 24, 1994

[54] FLOW TRANSDUCER

[75] Inventor: George Kadlicko, Mississauga, Canada

[73] Assignee: Micro Hydraulics Inc., Ontario, Canada

[21] Appl. No.: 896,172

[22] Filed: Jun. 10, 1992

[51] Int. Cl.5 .............................................. G01F 1/26
[52] U.S. Cl. ................................................ 73/861.54
[58] Field of Search ........... 73/861.53, 861.54, 861.55, 73/861.58

[56] References Cited

U.S. PATENT DOCUMENTS

| | | | |
|---|---|---|---|
| 4,304,136 | 12/1981 | McCabe et al. | 73/861.54 |
| 4,366,718 | 1/1983 | Nelson | 73/861.58 |
| 4,459,860 | 7/1984 | Walters | 73/861.55 |
| 4,507,976 | 4/1985 | Banko | 73/861.54 |
| 4,619,146 | 10/1986 | Teodorescu et al. | 73/861.54 |
| 5,024,105 | 6/1991 | Tentler et al. | 73/861.54 |

FOREIGN PATENT DOCUMENTS

| | | | |
|---|---|---|---|
| 0244976 | 11/1987 | European Pat. Off. | G01F 1/26 |
| 0427102 | 5/1991 | European Pat. Off. | G01F 1/38 |
| 2931215 | 2/1981 | Fed. Rep. of Germany | G01F 1/20 |
| 9006243 | 8/1990 | Fed. Rep. of Germany | G01F 1/24 |

Primary Examiner—Richard E. Chilcot, Jr.
Assistant Examiner—Harshad Patel
Attorney, Agent, or Firm—Ladas & Parry

[57] ABSTRACT

A flow transducer includes a piston movable in a sleeve to vary the area of an orifice. The piston may move in either direction from a position in which flow is prevented. Movement in both directions is opposed by a spring. The piston assumes a unique position for each flow rate and the position of the transducer is sensed to provide a signal indicative of low rate.

10 Claims, 1 Drawing Sheet

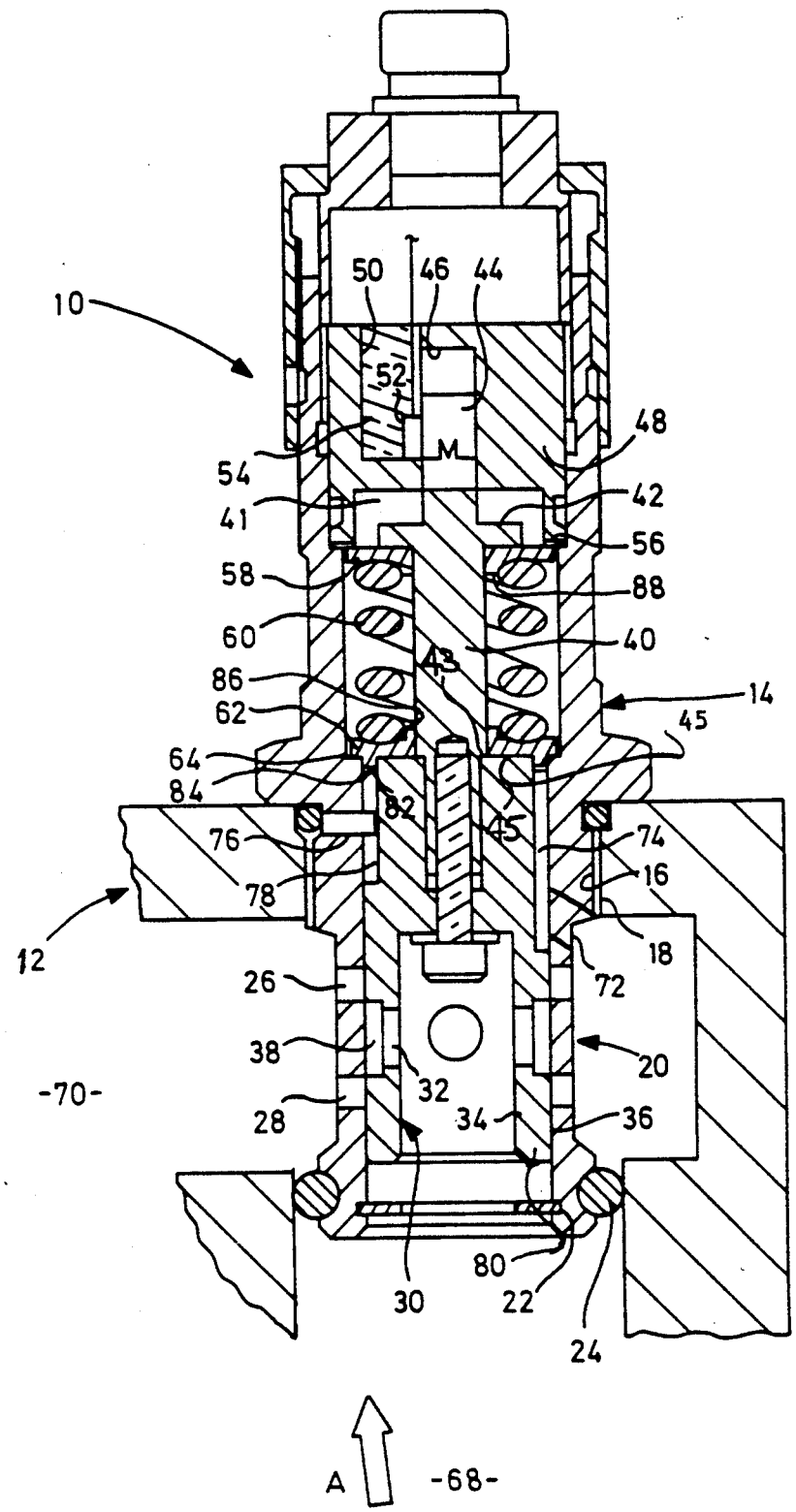

FLOW TRANSDUCER

The present invention relates to a flow transducer.

Flow transducers are used to determine the rate of flow of fluid in a duct or conduit and as such provide information about a fundamental parameter of most fluid systems. Fluid flow is, however, difficult to measure and most commercially available transducers provide a time-averaged indication of the flow rate rather than a dynamic indication of the flow rate. Thus the transducers require a certain period to make observations and then provide a signal indicative of the average flow rate over that period. For example, one commonly used flow transducer utilizes a turbine located within the conduit and a sensor determines the rotation of the turbine and provides a signal that indicates the rate of flow of fluid through the conduit.

Accurate monitoring or control of a fluid system depends upon the dynamic measurement of the flow in the system but at the same time it is important that the flow within the system is not disturbed by the measuring equipment. Moreover, it is desirable that the monitoring apparatus is capable of measuring small variations in relatively large flow rates and that it be robust and reliable.

Various proposals have been made to provide dynamic measurement of flow rates but none of these provide the versatility and accuracy necessary. U.S. Pat. No. 4,304,136 to McCabe; U.S. Pat. No. 4,507,976 to Banko and U.S. Pat. No. 4,619,146 to Teodorescu each show a dynamic flow meter in which a piston progressively exposes an orifice as flow rates increase with the position of the piston being indicative of the flow rate. These devices are, however, unidirectional and accordingly can only accomodate flows in one direction.

U.S. Pat. No. 4,366,718 to Nelson and U.S. Pat. No. 4,459,860 to Walters disclose a bidirectional device capable of measuring flows in each direction. In each of these patents, a movable piston is maintained centered at a no flow position relative to a fixed member by means of a pair of springs acting on opposite ends of the movable member. With each of these devices, the central position requires alignment between a pair of knife edges. However, in order to attain this position, the springs must be accurately matched as any difference in the length of the springs will offset the movable member. This will produce a non-linear response at low flow rates.

It is therefore an object of the present invention to provide a flow transducer to obviate or mitigate the above disadvantages.

According to the present invention, there is provided a flow transducer to measure the rate of flow of fluid in a conduit comprising a body, including a sleeve to be inserted in said conduit and present a barrier to flow in the conduit, a piston slidable within said sleeve and having first and second oppositely directed fluid reaction surfaces, one of which is subjected to fluid pressure on one side of said sleeve and the other of which is subject to fluid pressure on the opposite side of said sleeve, a first and second set of apertures formed in said sleeve and spaced apart in the direction of movement of the piston, a port in said piston and movable to overlie one or other of said sets of apertures and thereby define an orifice for fluid flow from one side of said sleeve to the other, biasing means acting between said piston and said body to bias said piston to a predetermined position in which said port is axially located between said apertures and flow past said sleeve is prevented, and a signal generating means associated with said piston to provide a signal indicative of the position thereof relative to said predetermined position, said biasing means comprising a coil spring located within a cavity in said body, said cavity including a pair of axially spaced abutment surfaces co-operating with said coil spring to inhibit axial movement of said spring beyond said abutment surfaces, said piston extending through said spring and being engageable with opposite ends thereof whereby axial movement of said piston from said predetermined position causes one end of said spring to engage an adjacent abutment surface and the opposite end of said spring to be engaged by said piston to compress the spring and said signalling means to provide a signal indicative of the rate of flow of fluid through said conduit.

An embodiment of the invention will now be described with reference to the accompanying drawing which shows a section through a flow transducer.

Referring therefore to the drawing, a flow transducer 10 is located within a conduit 12. The transducer 10 includes a body 14 which has an external thread 16 received in a threaded bore 18 on the wall of the conduit 12. A cylindrical sleeve 20 depends from the body 14 and has a circumferential groove 22 at its lower end that carries an O-ring 24. The 0-ring 24 is in sealing engagement with the wall of the conduit 12 so that the sleeve 20 acts as a barrier to fluid flowing through the conduit 12.

Two sets of apertures 26,28 respectively are provided in axially spaced locations on the sleeve 20. Each of the sets of apertures 26,28 includes four circumferentially spaced apertures that extend from the exterior wall of the sleeve 20 to the interior wall. The apertures are formed as rectangular slots whose length extends around the circumference of the sleeve 20. As such, fluid may flow past the barrier provided by the sleeve 20 by passing through either of the apertures 26 or 28.

A piston 30 is slidably mounted within the sleeve 20 and has a set of ports 32 extending between an inner surface 34 and an outer surface 36. An annular groove 38 extends around the outer surface 36 between the ports 32. The groove 38 is dimensioned so as to extend between but not intercept the peripheries of the apertures 26,28 while allowing the outer surface 36 to maintain a sealing engagement with each of the apertures. In the position shown in the drawing, fluid flow through the apertures 26,28 is prevented but axial movement of the piston 30 to either side of that position will allow flow through one or the other of the apertures.

The piston 30 includes an extension 40 that extends into a cavity 41 formed in the body 14. The extension 40 includes a flange 42 adjacent one end and carries an insert 44 of a magnetic material beyond the flange 42. The location of the flange 42 relative to the piston 30 is determined by a shoulder 43 formed in the extension 40 which abuts the end face 45 of piston 30. The distance between the flange 42 and end face 45 can thus be accurately maintained.

The magnetic insert 44 carried by extension 40 is slidably received within a bore 46 formed in an end cap 48 that is received within the body 14 to define one end of the cavity 41. The end cap 48 is bored as indicated at 50 to receive a transducer 52 of the Hall effect type in close proximity to the bore 46. The transducer 52 is sealed within the bore 50 by an epoxy resin 54 which locates the transducer 52 firmly within the end cap 48.

The end cap 48 includes a shoulder 56 that projects radially inwardly from the body 14. An annular disc 58 is located on the extension 40 below the flange 42 and extends radially to the shoulder 56. The disc 58 is free to slide on the extension 40 but axial movement is limited by either the shoulder 56 or the flange 42.

A coil spring 60 is located within the cavity 41 around the extension 40 and one end bears against the disc 58. The opposite end of the spring 60 bears against a similar disc 62 which is also free to slide relative to the extension member 40 and extends radially outwardly to abut a radial shoulder 64 at the lower end of the cavity 41. The disc 62 also abuts an end face 45 of the piston 30.

Axial extension of the spring 60 is thus limited by the abutment of the discs 58,62 with the shoulders 56,64 respectively but movement of the piston axially within the sleeve 20 will cause movement of one of the discs 58,62 and compression of the spring 60. The spring 60 thus acts to maintain the piston 30 with the groove 38 centered between the apertures 26,28 so that a barrier to flow in the conduit 12 is provided. The, spacing between the shoulders 56,64 corresponds to the spacing between the flange 42 and the end face 45 so that when the discs 58,62 abut the shoulders 56,64, they also abut the flange 42 and end face 45. The piston 30 is thus maintained centered by physical abutments rather than the characteristics of spring 60.

It will also be noted that the disc 62 includes an annular rib 82 which is received within a recess 84 formed on the end face 45. The rib 82 co-operates with the recess to ensure that the disc 62 remains centered on the end face 45 of the piston 30. An oppositely directed rib 86 is provided on the radially inner edge of the disc 62 to locate the spring 60. A similar rib 88 is provided on the disc 58 to locate the opposite end of the disc 58. The location of the discs 58,62 provided by the ribs maintains the spring 60 centered and avoids hysteresis of the piston 30 as it moves axially against the spring 60.

The sleeve 20 thus effectively divides the conduit 12 into upstream and downstream portions which, for the direction of flow indicated by arrow A, are designated 68,70 respectively. It will, however, be understood that with the embodiment shown in the drawings the direction of flow may be reversed so that portion 70 becomes the upstream and portion 68 becomes the downstream portion.

A duct 72 in the body 14 provides fluid communication between the downstream portion 70 and the cavity 42. Duct 72 communicates with an axial groove 74 formed in the outer surface 36 of the piston 30 so that fluid pressure in the downstream portion 70 acts on the end face 45 of the piston 30. An alignment between the duct 72 and the groove 74 is maintained by a pin 76 acting between the body 14 and a groove 78 to inhibit rotation of the piston 30 within the sleeve 20. Pin 76 also maintains alignment between the transducer 52 and magnetic insert 44 so that non-uniformities in the field of the insert 44 about its circumference will not produce erroneous signals from the transducer 52.

The piston 30 also presents a radial face 80 to the fluid in the upstream portion 68. The piston 30 is thus subjected to oppositely acting axial forces derived by the pressure on the faces 80 and 45. Any difference in those pressures will tend to act against the spring 60 and move the piston 30 axially within the sleeve 20 and allow the groove 38 to uncover one of the apertures 26,28.

In operation, therefore, the pressures in the upstream and downstream portions 68,70 respectively will be equal if there is no flow through the conduit 12. In this condition, the pressure forces acting on the piston 30 are equal and opposite and the piston 30 is located by the shoulders 56,64 in a position such that flow through the apertures 26,28 is prohibited.

Upon flow of fluid through the conduit 12 from the upstream portion 68 to the downstream portion 70, the pressure in the upstream portion will initially increase, causing the pressure forces on the face 80 to be greater than those on the face 45. The piston 30 thus moves axially within the sleeve 30 and causes the groove 38 to overlap the apertures 26. In this position, the fluid can flow from the upstream portion through the orifice defined by the overlapping of the aperture 26 with the groove 38 and into the downstream portion 70. Because of the flow through the orifice 26, a pressure differential will exist between the upstream and downstream portion 68,70 so that the pressure forces acting on the face 45 will be less than those on the face 80. The piston 30 will thus move axially upwardly as viewed in the drawings so that the piston face 45 moves toward the shoulder 56. The piston 30 carries the disc 62 with it as it moves axially upwardly but movement of the disc 58 is prohibited by the shoulder 56. The coil spring 60 is thus compressed and the force provided by the spring 60 on the piston 30 increases. The piston 30 will move to a position in which the pressure differential through the orifice 26 is balanced by the force of the spring 60. However, as the piston 30 moves the area of orifice also increases so that the range of pressure differentials across the piston over the range of flows will be less than would be experienced with a fixed orifice. Thus, for each flow rate through the conduit 12, the piston will adopt a particular position. Movement of the piston 30 is detected by the movement of the magnetic insert relative to the Hall effect transducer 52 and a voltage signal provided for each position of the piston. Thus, a signal is provided from the transducer 52 that is indicative of the rate of flow of fluid through the conduit 12. As the flow increases, the pressure differential across the piston 30 will increase and the piston 30 will move to a new position in which the spring 60 is further compressed and the forces acting on the piston again balanced. The transducer 52 thus provides a new signal indicative of the new flow rate.

If the flow of fluid reverses within the conduit 12 such that the portion 70 becomes the upstream portion and the portion 68 becomes the downstream portion, the pressure forces on face 45 will be greater than those acting on face 80. Thus, the piston 30 will move downwardly such that the disc 58 is carried by the flange 42 toward the shoulder 64. Again, the spring 60 is compressed until the forces acting on the piston are balanced. The insert 44 varies the signal from the Hall effect transducer 52 so that a unique signal is provided that indicates not only the flow rate but also the direction of flow of fluid within the conduit 12.

The transducer is calibrated against a master transducer or by specific flow measurement of the fluid. Conveniently, end cap 48 may accomodate a microprocessor that records the movement of the piston for a given flow rate and produces a predetermined output signal for that flow rate. In this way, the transducers are interchangeable even if their piston displacement varies from transducer to transducer.

It will be seen, therefore, that the transducer provides a simple yet robust transducer that provides a signal indicative of flow rates and whose output varies as the flow in the conduit 12 varies. In view of the fact that the position of the piston 30 is acted upon directly by fluid flowing through the apertures 26,28 it will be apparent that a dynamic measurement of the flow rate is provided and any fluctuations will cause a corresponding movement of the piston 30. The null position of the piston is maintained positively and a single spring is used to balance motion in each direction and thereby minimize manufacturing difficulties.

I claim:

1. A flow transducer to measure the rate of flow of a fluid in a conduit, said transducer including a body to be inserted in said conduit and having a sleeve serving as a fixed barrier to flow in the conduit, a piston slidable within said sleeve and having first and second fluid reaction surfaces, one of which is subjected to fluid pressure acting in one direction on one side of said sleeve and the other of which is subject to fluid pressure acting in the opposite direction on the opposite side of said sleeve, a first and second set of apertures formed in said sleeve and spaced apart in the direction of movement of the piston, a port in said piston and movable to overlie one or other of said sets of apertures and thereby define an orifice for fluid flow from one side of said sleeve to the other, biasing means acting between said piston and said body to bias said piston to a predetermined position in which said port is axially located between said apertures and flow past said sleeve is prevented, and a signal generating means associated with said piston to provide a signal indicative of the position thereof relative to said predetermined position, said biasing means comprising a coil spring located within a cavity in said body, said cavity including a pair of axially spaced abutment surfaces co-operating with said coil spring to inhibit axial movement of said spring beyond said abutment surfaces, said piston extending through said spring and being engageable with opposite ends thereof whereby axial movement of said piston in either direction from said predetermined position causes one end of said spring to engage an adjacent abutment surface and the opposite end of said spring to be engaged by said piston to compress the spring and causing said signalling means to provide a signal indicative of the rate of flow of fluid through said conduit.

2. A flow transducer according to claim 1 wherein a pair of discs are located at opposite ends of said spring and extend radially to respective ones said abutment surfaces, one of said discs being engaged by said piston upon displacement thereof to move said disc from one of said abutment surfaces and toward the other of said abutment surfaces to compress said spring.

3. A flow transducer according to claim 2 wherein said discs are axially slidable on an extension of said piston and located between axially spaced abutment surfaces on said extension.

4. A flow transducer according to claim 3 wherein one of said abutment surfaces is one of said fluid reaction surfaces.

5. A flow transducer according to claim 1 wherein guide means act between said body and said piston to inhibit rotation of said piston relative to said body.

6. A transducer according to claim 5 wherein a duct is provided in said body for fluid communication between said conduit and said cavity.

7. A transducer according to claim 6 wherein said duct is aligned with a passageway formed in said piston.

8. A transducer according to claim 5 wherein said signalling means includes a magnetic element secured to said piston and a Hall effect sensor located in said body.

9. A transducer according to claim 4 wherein an annular rib is provided on each of said discs to locate radially said spring.

10. A transducer according to claim 9 wherein an annular rig is provided on one of said discs to locate said disc radially relative its respective abutment.

* * * * *